(12) United States Patent
Jones

(10) Patent No.: US 7,457,195 B2
(45) Date of Patent: Nov. 25, 2008

(54) ESTIMATING THE TIME OF ARRIVAL OF A SEISMIC WAVE

(75) Inventor: Robert Hughes Jones, Cornwall (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 97 days.

(21) Appl. No.: 10/544,280

(22) PCT Filed: Jan. 14, 2004

(86) PCT No.: PCT/GB2004/000126

§ 371 (c)(1),
(2), (4) Date: Aug. 3, 2005

(87) PCT Pub. No.: WO2004/070424

PCT Pub. Date: Aug. 19, 2004

(65) Prior Publication Data

US 2006/0092765 A1    May 4, 2006

(30) Foreign Application Priority Data

Feb. 8, 2003    (GB)    ................. 0302898.2

(51) Int. Cl.
*G01V 1/28* (2006.01)
(52) U.S. Cl. .............................. 367/38; 367/46; 367/75; 702/15; 702/18
(58) Field of Classification Search .................. 367/38, 367/75, 46; 702/15, 18
See application file for complete search history.

(56) References Cited

U.S. PATENT DOCUMENTS

| | | | |
|---|---|---|---|
| 4,596,005 A | 6/1986 | Frasier | |
| 4,611,311 A * | 9/1986 | Frasier | 367/38 |
| 4,686,657 A * | 8/1987 | Dellinger et al. | 367/75 |
| 4,881,209 A | 11/1989 | Bloomquist et al. | |
| 5,996,726 A * | 12/1999 | Sorrells et al. | 181/106 |
| 6,067,275 A | 5/2000 | Sayers | |
| 6,639,871 B1 * | 10/2003 | Garotta et al. | 367/75 |
| 6,731,568 B1 * | 5/2004 | Audebert et al. | 367/75 |
| 6,760,667 B1 * | 7/2004 | Kelly et al. | 702/14 |
| 2003/0021184 A1 * | 1/2003 | Zhang | 367/14 |
| 2004/0008578 A1 * | 1/2004 | Leaney | 367/15 |

FOREIGN PATENT DOCUMENTS

| | | |
|---|---|---|
| GB | 2 275 337 A | 8/1994 |
| WO | 01/31364 A1 | 5/2001 |
| WO | 02/059647 A1 | 8/2002 |

OTHER PUBLICATIONS

Lomax, et al. "Precise, absolute earthquake locatoin under Somma-Vesusvius volcano using a new three-dimensional velocity model." Geophys. J. Int. (2001) 146, 313-331.*
James, et al. "On locating local earthquakes usng small networks." Bulletin of the Seismological Society of America, Jun. 1969.*
Gaiser J E Multicomponent Vp/Vs correlation analysis Geophysics, Society of Exploration Geophysicists. Tulsa, US vol. 61, No. 4, Jul. 1996. pp. 1137-1149.

* cited by examiner

*Primary Examiner*—Jack W Keith
*Assistant Examiner*—Scott A Hughes
(74) *Attorney, Agent, or Firm*—Steven Gahlings; Vincent Loccisano; Jody Lynn Destefanis

(57) ABSTRACT

Data processing means are described for calculating an estimated time of arrival of a seismic or microseismic P or S wave at a sensor station, based on a P to S wave velocity ratio, a calculated estimated time of origin of the event and, where the estimated arrival time of a P wave is to be calculated, a picked arrival time of the S wave at the sensor station or, where the estimated arrival time of a S wave is to be calculated, a picked arrival time of the P wave at the sensor station.

11 Claims, 1 Drawing Sheet

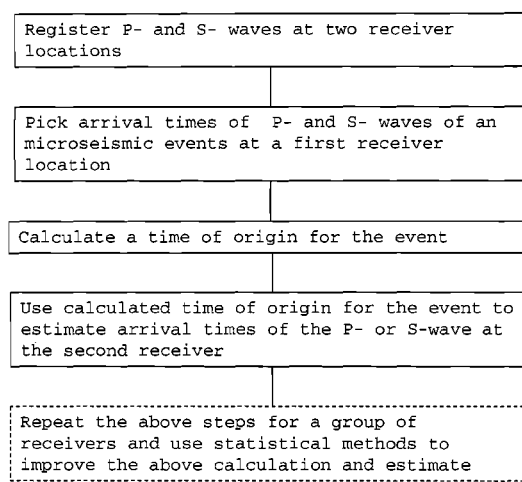

```
┌─────────────────────────────────────────────────┐
│ Register P- and S- waves at two receiver        │
│ locations                                        │
└─────────────────────────────────────────────────┘
                        │
┌─────────────────────────────────────────────────┐
│ Pick arrival times of  P- and S- waves of an    │
│ microseismic events at a first receiver         │
│ location                                         │
└─────────────────────────────────────────────────┘
                        │
┌─────────────────────────────────────────────────┐
│ Calculate a time of origin for the event        │
└─────────────────────────────────────────────────┘
                        │
┌─────────────────────────────────────────────────┐
│ Use calculated time of origin for the event to  │
│ estimate arrival times of the P- or S-wave at   │
│ the second receiver                             │
└─────────────────────────────────────────────────┘
                        │
┌ - - - - - - - - - - - - - - - - - - - - - - - -┐
│ Repeat the above steps for a group of           │
│ receivers and use statistical methods to        │
│ improve the above calculation and estimate      │
└ - - - - - - - - - - - - - - - - - - - - - - - -┘
```

FIG. 1

ESTIMATING THE TIME OF ARRIVAL OF A SEISMIC WAVE

The present invention relates to a method of calculating an estimated time of arrival of a seismic or microseismic P or S wave at a sensor station, data processing means for carrying out such a method, and a data carrier comprising computer readable program means for carrying out such a method when run on a computer.

A typical seismic or microseismic event produces both P-wave and S-wave signals. These distinct signals travel at different velocities through the earth. For a wide range of crustal rock types the ratio between the P-wave and S-wave velocity is well known and does not vary to any great extent. Indeed in many instances it is not possible a priori to obtain an-accurate S-wave velocity and so the S-wave velocity structure for a region of interest is often derived by assuming a constant ratio with the P-wave velocity structure. Thus we find that, in practice, the two seismic velocities structures within a volume of interest will show an approximately constant ratio to each other, even where the value of both types of velocity changes.

The normal method of estimating the location and time (in terms of the coordinates x, y, z and time zero (t0)) at which a seismic or microseismic event occurs involves positioning a number of sensor stations, comprising geophones or the like, at various locations in a catchment area, and measuring the arrival times at each of said stations of the P and S waves generated. Once the time of arrival of each wave at each station has been picked (i.e. decided upon based on the seismic data recorded at the station concerned), a guess is made at the location and time of the seismic or microseismic event, and the known or assumed P and S wave velocities are used to calculate the times at which the P and S waves would reach each station, assuming that this guess were correct. These calculated arrival times, based on the guessed location and time of origin, are then compared with the picked arrival times (which, as noted above, are based on the seismic data actually recorded) and the location and time of origin adjusted, via a mathematical processes known as the least squares process, such that the final estimated location and time of origin of the event best fits, in a least squares sense, with the picked arrival times of the waves at the stations.

While the above method is generally accepted to be the best method of event location currently available, the reliability and accuracy of the location of a given seismic or microseismic event, recorded on a given network, is heavily dependent upon the accuracy and reliability of the arrival time picking. In some cases, the quality of the seismic data may make it difficult to identify a distinct arrival time at all. If a picked arrival time is badly incorrect, or worse still a wave type wrongly identified (for example where a P-wave picked as an S-wave or a P to S conversion picked as an S-wave), the final estimated location and time of origin of the event is likely to differ significantly from the true location and time. Furthermore, the least squares location process means that the effect of a single bad timing is spread out and manifests itself in all the channel residuals and the overall misfit of the location, making the identification of incorrect pick less than straightforward.

According to one aspect of the present invention, data processing means for calculating an estimated time of arrival of a seismic or microseismic P or S wave at a sensor station are provided, comprising a data processor adapted to:

a) calculate an estimated time of origin for the seismic or microseismic event generating the P and S waves, based on a P to S wave velocity ratio and picked arrival times of the P and S waves at a sensor station other than the one for which the estimated time of arrival of the P or S wave is to be calculated; and b) calculate the estimated time of arrival of the P or S wave, based on a P to S wave velocity ratio, the estimated time of origin of the event and, where the estimated arrival time of a P wave is to be calculated, a picked arrival time of the S wave at the sensor station for which the estimated arrival time of the P wave is being calculated or, where the estimated arrival time of a S wave is to be calculated, a picked arrival time of the P wave at the sensor station for which the estimated arrival time of the S wave is to be calculated.

The data processor may be adapted to calculate estimated arrival times for both the P and S waves at a sensor station.

Preferably, the data processor is adapted to calculate a plurality of estimated times of arrival of the P and/or S wave at a sensor station, based on a plurality of estimated times of origin for the microseismic event calculated from the picked arrival times of the P and S waves at a plurality of sensor stations other than the one at which the estimated times of arrival are to be calculated. The data processor may be further adapted to display the picked arrival times and estimated arrival times in relation to each other such that the clustering pattern of the arrival times can be analysed. Where this is the case, the data processor may also be adapted to display information regarding the calculation of any particular estimated arrival time in response to the selection of said estimated arrival time by an user.

Preferably, the data processor is adapted to calculate one or more estimated times of arrival for the P and/or S waves at each sensor station in a network of sensor stations, wherein for each sensor station the necessary estimated time or times of origin are calculated from the picked arrival times of the P and S waves at one or more of the other stations in said network.

In some cases, the data processor may require the user to pick arrival times for the P and S waves at the various sensor stations by studying the seismic data recorded at each station, and to then provide the data processor with the picked arrival times. Alternatively, the data processor may be adapted to receive seismic data from the sensor stations and to pick arrival times for the P and S wave at each sensor station based on said seismic data.

Where a number of possible arrival times for a wave at a sensor station could be picked (either by the user, or by the data processor itself), the data processor may adapted to compare said possible arrival times with any estimates calculated for the arrival time of said wave at said station in order to determine which of the possible picked arrival times are more likely to correspond to the true arrival time of said wave at said sation. The data processor may be further adapted to select or modify one of said possible arrival times in order to arrive at a final picked arrival time that, based on the above determination, seems most like to correspond to the true arrival time of said wave. Alternatively, the data processor may be adapted to indicate which of the possible arrival times should be selected or modified in order to arrive at a final picked arrival time that seems, based on the above determination, to be most likely to correspond with the true arrival time.

According to another aspect of the present invention, a data carrier comprising computer readable program means for adapting a computer to function as the data processing means according to the above aspect of the invention is provided.

According to a further aspect of the present invention, a method of calculating an estimated time of arrival of a seismic or microseismic P or S wave at a sensor station is provided, said method comprising the steps of:

a) calculating an estimated time of origin for the seismic or microseismic event generating the P and S waves, based on a P to S wave velocity ratio and picked arrival times of the P and S waves at a sensor station other than the one for which the estimated time of arrival of the P or S wave is to be calculated; and b) calculating the estimated time of arrival of the P or S wave, based on a P to S wave velocity ratio, the estimated time of origin of the event and, where the estimated arrival time of a P wave is to be calculated, a picked arrival time of the S wave at the sensor station for which the estimated arrival time of the P wave is being calculated or, where the estimated arrival time of a S wave is to be calculated, a picked arrival time of the P wave at the sensor station for which the estimated arrival time of the S wave is to be calculated.

Thus the present invention provides means for obtaining one or more estimates as to the arrival time of the P and/or S waves at one or more of the sensing stations, without the location of the seismic or microseismic event first having to be located. The estimated arrival times thus produced can be used in a number of ways. Where the seismic data recorded at a station cannot be interpreted with sufficient reliability in order to make a pick, an estimate of the arrival time can be used to replace the pick that is not being made. Where a number of sensing stations are present, a spread of estimated arrival times can be calculated, in order to provide the user with sufficient information to identify possible bad picks before an attempt at event localisation is made. Such spreads of estimates can also be used for analysis of the P to S wave velocity structure and ratio, as part of an auto-location process and/or for estimating picking uncertainty.

A specific embodiment of the invention will now be described, solely by way of example.

According to the present embodiment, the data processing means comprise a computer running software for calculating the necessary estimated times of origin and arrival (though this could equally be achieved via suitable electronic hardware) by applying certain algorithms, the derivation and application of which are explained below.

If one assumes that the network of sensor stations (each of which could be a seismic detector as described in GB-A-2 275 337 for example) are deployed in an arbitrarily complex isotropic earth with a constant or near to constant P- to S-wave ratio, then the distance (D) of a microseismic event from a station can be expressed as:

$$D=(Ts-To)Vs$$

and/or $$D=(Tp-To)Vp$$

where Vs is the S-wave velocity, Vp is the P-wave velocity, Tp is the arrival time of the P-wave at the station, Ts is the arrival time of the S-wave at the station, and To is the time of origin of the microseismic event generating said P- and S-waves.

Multiplying through the two equations gives:

$$TsVs-ToVs=D$$

and/or $$TpVp-ToVp=D$$

Eliminating D, the source to the distance, we get one equation:

$$TsVs-ToVs=TpVp-ToVp$$

Collecting all terms including To, the origin time, gives:

$$ToVp-ToVs=TpVp-TsVs$$

$$\therefore ToVpVs-To=TpVp/Vs-Ts$$

$$\therefore To(Vp/Vs-1)=TpVp/Vs-Ts$$

Vp/Vs represents the P-wave to S-wave velocity ratio, which we will designate as R. Substituting R for Vp/Vs gives:

$$To(R-1)=TpR-Ts$$

$$\therefore To=(TpR-Ts)/(R-1)$$

We now have an estimate of the origin time of the earthquake in terms of the arrival times (Tp and Ts) of the P- and S-waves at the station and the ratio R between the P-wave to S-wave velocity field ratio.

This equation has R in it twice and in order to re-arrange it so that R only appears once we can add a +Tp and a −Tp term to the top line of the equation, which gives:

$$To = \frac{TpR + Tp - Tp - Ts}{(R-1)}$$

Re-arranging we get:

$$To = \frac{Tp(R-1) + Tp - Ts}{(R-1)}$$

Separating terms gives:

$$To = \frac{Tp(R-1)}{(R-1)} + \frac{Tp}{(R-1)} - \frac{Ts}{(R-1)}$$

Now we can cancel the (R−1) term in the first part of the right-hand side of the equation to give:

$$To = Tp + \frac{Tp}{(R-1)} - \frac{Ts}{(R-1)}$$

To finally give:

$$To=Tp-(Ts-Tp)/(R-1)$$

Thus, where the arrival times of the P- and S-waves at a station can be picked with a reasonable degree of certainty and given a constant velocity-ratio earth model we can, from that station, get an estimate of the origin time of the event based solely on the picked arrival times of the P- and S-waves and the assumed P- and S-wave velocity field ratio. Note that this equations does not require knowledge of the actual location of the microseismic event or the velocity fields for the P- and S-waves.

Where the station for which the P- and S-wave arrivals have been picked is designated as station 1, we can add a 1 subscript to show that these terms apply to station 1 to get:

$$To_1=Tp_1-(Ts_1-Tp_1)/(R-1) \qquad (1)$$

where $To_1$ is the origin time estimated by using timings from station 1.

Likewise, if the arrival times were picked at a different station, designated station 2, we can add a 2 subscript to get:

$$To_2 = Tp_2 - (Ts_2 - Tp_2)/(R-1) \quad (2)$$

Note that, given the assumption of an isotropic earth, the velocity field ratio remains constant for both stations.

However, the times of origin calculated from stations 1 and 2 should be identical, since the same event is generating the waves recorded at both stations. Thus, in circumstances where an S-wave pick at station 2 has not been possible, or the accuracy of the pick seems uncertain, such that an estimate for the S-wave arrival time at station 2 is desired, this can be obtained by substituting $To_2$ for $To_1$ and $Ts_{e2}$ for $Ts_2$ in equation (2) to get:

$$To_1 = Tp_2 - (Ts_{e2} - Tp_2)/(R-1)$$
$$\therefore To_1(R-1) = Tp_2(R-1) - (Ts_{e2} - Tp_2)$$
$$= Tp_2(R-1) - Ts_{e2} - Tp_2$$
$$\therefore Ts_{e2} = Tp_2(R-1) - To_1(R-1) + Tp_2$$
$$= Tp_2 R - Tp_2 - To_1 R - To_1 + Tp_2$$
$$= Tp_2 R - To_1 R - To_1$$
$$= (Tp_2 - To_1)R - To_1$$
$$\therefore Ts_{e2} = R(Tp_2 - To_1) - To_1$$

Where $Ts_{e2}$ represents an estimate for the S-wave arrival time at station 2. Note that the calculation of the estimated time of arrival of the S-wave at station 2 requires only the P and S picks from station 1 (in order to calculate $To_1$), the P-wave pick at sation 2 and the assumed constant R ratio.

Likewise, where an estimate for the P-wave arrival time at station 2 is desired, this can be obtained by substituting $To_2$ for $To_1$ and $Tp_{e2}$ for $Tp_2$ in equation (2) to get:

$$To_1 = Tp_{e2} - (Ts_2 - Tp_{e2})/(R-1)$$
$$\therefore To_1(R-1) = Tp_{e2}(R-1) - (Ts_2 - Tp_{e2})$$
$$= Tp_{e2}(R-1) - Ts_2 - Tp_{e2}$$
$$\therefore To_1(R-1) + Ts_2 = Tp_{e2}(R-1) + Tp_{e2}$$
$$= Tp_{e2} R - Tp_{e2} + Tp_{e2}$$
$$= Tp_{e2} R$$
$$\therefore Tp_{e2} = (To_1(R-1) + Ts_2)/R$$
$$= (To_1 R - To_1 + Ts_2)/R$$
$$= To_1 R/R + (Ts_2 - To_1)/R$$
$$\therefore Tp_{e2} = To_1 + (Ts_2 - To_1)/R$$

where $Tp_{e2}$ is the estimated P-wave arrival time for station 2.

It follows, that where P-wave and S-wave picks for station 2 have been made, the process described above can be reversed in order to obtain estimates for the picks, both P-wave and S-wave, on station 1. Indeed, using the above process, every station for which a P-wave and an S-wave pick has been made allows an estimated time of arrival to be calculated for the P- and/or S-waves at another station in the network (assuming an arrival time for the P- or S-wave not being estimated has been picked for said station).

Thus, for a network of six stations, if all the P-wave and S-wave picks are made at each station then five estimated times of arrival for each wave at each station can also be calculated. If a pick cannot be made for the arrival time of one wave at one of the stations (due to the arrival time of the wave not being identifiable from the seismic data) then one of the five estimated arrival times for said wave at said station (or an average thereof) can be used for the purpose of subsequent localisation of the microseismic event. Likewise, if all the picks have been made, but one of the picks is significantly different from the true arrival time (again due to the difficult of identifying the true arrival time from the data recorded), then the estimates produced from the bad pick will differ significantly from the other estimates which do not include the bad pick, allowing the bad pick to be identified and corrected (or indeed replaced by an estimate) prior to the localisation process. This is in contrast to attempting to examine the channel residuals produced by the localisation process in order to identify a bad pick, since each channel residue is influenced by all the picks used in the location as well as the P to S velocity structure ratio and three timings.

The estimated arrival times that have been generated can also be used to help improve the consistency of arrival time picking. If the assumption of a constant P to S velocity ratio is true then all the estimated arrival times for a wave should form a tight cluster around the picked arrival time for a wave. If such a clustering pattern is not observed, there are three basic reasons why this may be the case, which are as follows:

1) the assumption of a constant p to s ratio is does not hold true for the area concerned;
2) the p to s ratio used is incorrect or
3) one or more of the picked arrival times is incorrect to a significant degree.

Reasons (1) and (2) are related to the velocity structure. If the reason is reason (1) then this can be easily remedied by changing the P or S wave velocity until good clustering is observed. If the reason is reason (2) then the P to S ratio can be adjusted until the optimum ratio is found that gives the best clustering around a group of many timings from many events. Thus the process of estimating arrival times described herein could also be applied in order to optimise the velocity structure. Typically it is the S-wave velocity that is most poorly resolved and so in most cases it will be this velocity that needs to be altered in order to obtain the optimum velocity ratio and structure. It is possible to distinguish between reasons (1) and (2) in that where reason (2) applies (ie. where the ratio is constant but inappropriate) good clustering together of the estimated picks will occur, but no the around the picked arrival times. Where reason (1) applies the effect will be more subtle and the estimated picks will not cluster to the same extent. In practice this may be a more difficult situation to identify, but in most cases the variations in the P to S ratio within a particular region are likely to be small, such that this will at most be a second order effect. Once many events have been located, it would be possible to investigate the relationship between location and P to S ratio based on the data obtained.

In most cases reason (3) will be the cause of the desired clustering pattern not being observed. In order to assist the user in identifying which stations picked arrival times are giving the bad estimate, the software may further allow for the user to select any of the displayed estimates using the computer mouse or curser keys, in response to which the station that gave rise to the estimate is highlighted. In this way the program implement on the computer guides the user to the station with the "worst" picks. This process can furthermore be repeated until the clustering of the estimated and measured picks appears satisfactory to the user.

The program running on the computer may also be designed to use the estimated picks as part of an auto-location process. As has been described above, a "good" pick can be identified by the fact that it has a cluster of estimated picks around it. During the process of auto-timing it is common for the computer to initially select a number of potential picks for the arrival time of a wave at a station. By applying the above process of generating estimates for each pick and analysing the clustering of the estimates around each prospective auto-picks, the program can be designed to eliminate those prospective auto-picks that are less likely to correspond to the true arrival time. The program can also use the degree of clustering to decide if an event has been picked well enough to warrant storing and use for a subsequent localisation process.

While estimating picking uncertainty or accuracy can be a difficult and subjective process, it is also possible to use the estimated arrival times in order to provide an indication of picking uncertainty. Each estimated arrive time includes two other arrival times. For example, the S-wave arrive time on station n involves the following picks:

| $Tp_1$ | $Ts_1$ | $Tp_n$ |
| $Tp_2$ | $Ts_2$ | $Tp_n$ |
| $Tp_3$ | $Ts_3$ | $Tp_n$ |
| $Tp_4$ | $Ts_4$ | $Tp_n$ |
| $Tp_5$ | $Ts_5$ | $Tp_n$ |

In which $Tp_1$ indicates the picked arrival time for the P-wave at station 1, $Ts_1$ indicates the picked arrival time for the S-wave at station 1, $Tp_n$ indicates the picked arrival time of the P-wave at station n, and so on. From the above it will be apparent that $Tp_n$ is a constant in all the estimates. Thus the scatter in the estimates of the $Ts_n$ will be a function of the picking uncertainty in the P- and S-wave picking for each channel.

Some of the above steps or components of the inventive method or apparatus are summarized in the block diagram of FIG. 1

The invention claimed is:

1. Data processing apparatus for calculating an estimated time of arrival of a seismic or microseismic P or S wave at a sensor station, the seismic or microseismic P or S wave being generated by a seismic or a microseismic event, comprising a data processor that:
    a) calculates an estimated time of origin for the seismic or the microseismic event generating the P and S waves, based on a P to S wave velocity ratio and picked arrival times of the P and S waves at a sensor station other than the one for which the estimated time of arrival of the P or S wave is to be calculated; and
    b) calculates the estimated time of arrival of the P or S wave without knowledge of a location of the seismic or microseismic event based on a P to S wave velocity ratio, the estimated time of origin of the event and, where the estimated arrival time of a P wave is to be calculated, a picked arrival time of the S wave at the sensor station for which the estimated arrival time of the P wave is being calculated or, where the estimated arrival time of a S wave is to be calculated, a picked arrival time of the P wave at the sensor station for which the estimated arrival time of the S wave is to be calculated.

2. The apparatus according to claim 1, wherein said data processor calculates estimated arrival times for both the P and S waves at a sensor station.

3. The apparatus according to claim 1, wherein said data processor is configured to calculate a plurality of estimated times of arrival of the P and/or S wave at a sensor station, based on a plurality of estimated times of origin for the seismic or the microseismic event calculated from the picked arrival times of the P and S waves at a plurality of sensor stations other than the one at which the estimated times of arrival are to be calculated.

4. The apparatus according to claim 3, wherein the data processor is further configured to display the picked arrival times and estimated arrival times in relation to each other such that the clustering pattern of the arrival times can be analysed.

5. The apparatus according to claim 4, wherein the data processor comprises a display for displaying information regarding the calculation of any particular estimated arrival time in response to the selection of said estimated arrival time by a user.

6. The apparatus according to claim 1, wherein said data processor calculates one or more estimated times of arrival for the P and/or S waves at each sensor station in a network of sensor stations, wherein for each sensor station the necessary estimated time or times of origin are calculated from the picked arrival times of the P and S waves at one or more of the other stations in said network.

7. The apparatus according to claim 1, wherein the data processor receives seismic data from the sensor stations and picks arrival times for the P and S wave at each sensor station based on said received seismic data.

8. The apparatus according to claim 1, wherein, with a number of possible arrival times for a wave at a sensor station, the data processor processes said possible arrival times with any estimates calculated for the arrival time of said wave at said station in order to determine an arrival time of said wave at said station.

9. The apparatus according to claim 8, wherein the data processor is configured to select or modify one of said possible arrival times in order to arrive at a final picked arrival time based on said determination.

10. The apparatus according to claim 8, wherein the data processor processes which of the possible arrival times should be selected or modified in order to arrive at a final picked arrival time based on said determination.

11. A method of calculating an estimated time of arrival of a seismic or microseismic P or S wave at a sensor station, the seismic or microseismic P or S wave being generated by a seismic or a microseismic event, said method comprising the steps of:
    a) calculating an estimated time of origin for the seismic or the microseismic event generating the P and S waves, based on a P to S wave velocity ratio and picked arrival times of the P and S waves at a sensor station other than the one for which the estimated time of arrival of the P or S wave is to be calculated; and
    b) calculating the estimated time of arrival of the P or S wave, based on a P to S wave velocity ratio, the estimated time of origin of the event and, where the estimated arrival time of a P wave is to be calculated, a picked arrival time of the S wave at the sensor station for which the estimated arrival time of the P wave is being calculated or, where the estimated arrival time of a S wave is to be calculated, a picked arrival time of the P wave at the sensor station for which the estimated arrival time of the S wave is to be calculated, wherein the estimated time of arrival is calculated without knowledge of a location of the seismic or microseismic event.

* * * * *